US010902167B1

(12) United States Patent
Peddawad et al.

(10) Patent No.: US 10,902,167 B1
(45) Date of Patent: Jan. 26, 2021

(54) FEEDBACK-AWARE SLACK STEALING ACROSS TRANSPARENT LATCHES EMPOWERING PERFORMANCE OPTIMIZATION OF DIGITAL INTEGRATED CIRCUITS

(71) Applicant: International Business Machines Corporation, Armonk, NY (US)

(72) Inventors: Chaitanya Ravindra Peddawad, Karnataka (IN); Kerim Kalafala, Rhinebeck, NY (US); Alexander Joel Suess, Hopewell Junction, NY (US); Hemlata Gupta, Hopewell Junction, NY (US); Gregory Schaeffer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 16/506,746

(22) Filed: Jul. 9, 2019

(51) Int. Cl.
*G06F 119/12* (2020.01)
*G06F 30/3312* (2020.01)
*G06F 30/30* (2020.01)

(52) U.S. Cl.
CPC .......... *G06F 30/3312* (2020.01); *G06F 30/30* (2020.01); *G06F 2119/12* (2020.01)

(58) Field of Classification Search
CPC .................................................. G06F 2119/12
USPC ......................................................... 716/134
See application file for complete search history.

(56) References Cited

U.S. PATENT DOCUMENTS

| | | |
|---|---|---|
| 6,996,515 B1 | 2/2006 | Foltin et al. |
| 7,743,354 B2 | 6/2010 | Albrecht et al. |
| 7,987,440 B2 | 7/2011 | Kalafala et al. |
| 9,734,268 B2 | 8/2017 | Berry et al. |
| 9,754,062 B2 | 9/2017 | Kalafala et al. |
| 2013/0111425 A1 | 5/2013 | Kumar et al. |
| 2017/0132347 A1* | 5/2017 | Kalafala ............. G06F 30/3312 |
| 2018/0239844 A1 | 8/2018 | Hieter et al. |

FOREIGN PATENT DOCUMENTS

WO    WO2012082498    6/2012

OTHER PUBLICATIONS

Albrecht, C., Korte, B., Schietke, J. et al. (1999). Cycle time and slack optimization for VLSI-chips. Proceedings of the 1999 IEEE/ACM international conference on Computer-aided design, pp. 232-238.

(Continued)

*Primary Examiner* — Eric D Lee
(74) *Attorney, Agent, or Firm* — Erik Johnson; Otterstedt, Wallace & Kammer, LLP

(57) ABSTRACT

To increase the efficiency of electronic design automation, in a putative electronic logic circuit design, at least one transparent latch is identified as a candidate for slack stealing. An initial timing slack, available for stealing, and associated with the at least one transparent latch, is determined. Responsive to a determination that the initial timing slack available for stealing is insufficient, it is determined whether the initial timing slack available for stealing is on a feedback path. If so, responsive to determining that the initial timing slack available for stealing is on the feedback path, the initial timing slack available for stealing is replaced with a next worse slack.

20 Claims, 8 Drawing Sheets

(56) References Cited

OTHER PUBLICATIONS

Lin, I., Ludwig, J. A., & Eng, K. (1992). Analyzing cycle stealing on synchronous circuits with level-sensitive latches. Proceedings of the 29th ACM/IEEE Design Automation Conference, pp. 393-398.
Yen's algorithm—Wikipedia, downloaded from https://en.wikipedia.org/wiki/Yen's_algorithm Apr. 29, 2019 pp. 1-6.
Huang TW, Wu PC, Wong MD. Ul-timer: an ultra-fast clock network pessimism removal algorithm. In2014 IEEE/ACM International Conference on Computer-Aided Design (ICCAD) Nov. 2, 2014 (pp. 758-765). IEEE.

\* cited by examiner

FEEDBACK-AWARE SLACK STEALING ACROSS TRANSPARENT LATCHES EMPOWERING PERFORMANCE OPTIMIZATION OF DIGITAL INTEGRATED CIRCUITS

BACKGROUND

The present invention relates to the electrical, electronic, and computer arts, and more specifically, to semiconductor Electronic Design Automation (EDA) and the like.

EDA involves the use of software tools for designing electronic systems such as integrated circuits (ICs) and printed circuit boards. Generally, ICs have data signals and a clock; the data signal needs to reach a certain node at the correct time vis-a-vis the time when the corresponding clock cycles the device at that node. If the data signal does not arrive in time, the clock is too fast, or alternatively, the data signal is taking too long to propagate (path is too slow).

"Slack" refers to the margin between the data signal and the clock signal; if the data signal arrives with time to spare, there is positive slack; if the data signal arrives just in time, there is zero slack; and if the data signal arrives too late, there is negative slack. High performance chip designs are typically constrained to achieve certain timing goals (positive slack). Among the chip components, two types of storage elements include non-transparent latches (e.g., flip-flops) and transparent latches. Unlike edge-triggered non-transparent latches, transparent latches are able to transmit data during the period when the clock is active (referred to as the transparent window). During static timing analysis, which is used to verify the timing correctness of digital integrated circuits, transparent latches are often analyzed by assuming a discrete cycle boundary within the active clock interval by which a stable value will propagate to the latch output. "Slack stealing," also referred to as "slack balancing," "slack borrowing," "slack adjustment," "cycle stealing," "cycle boundary adjustment," and the like, refers to a technique wherein paths are adjusted to "steal" excess slack from a path with positive slack and provide it to a path that has negative slack or an inadequate margin (balancing across latches). Path adjustment is essentially achieved by adjusting the cycle boundary of the aforementioned transparent window which directly contributes to data path slack calculations.

SUMMARY

Principles of the invention provide techniques for feedback-aware slack stealing across transparent latches empowering performance optimization of digital integrated circuits. In one aspect, an exemplary method for increasing the efficiency of electronic design automation includes identifying, in a putative electronic logic circuit design, at least one transparent latch as a candidate for slack stealing; determining an initial timing slack, available for stealing, associated with the at least one transparent latch; responsive to a determination that the initial timing slack available for stealing is insufficient, determining whether the initial timing slack available for stealing is on a feedback path; and responsive to determining that the initial timing slack available for stealing is on the feedback path, replacing the initial timing slack available for stealing with a next worse slack.

In another aspect, an exemplary computer includes a memory; and at least one processor, coupled to the memory, and operative to increase the efficiency of electronic design automation by: identifying, in a putative electronic logic circuit design, at least one transparent latch as a candidate for slack stealing; determining an initial timing slack, available for stealing, associated with the at least one transparent latch; responsive to a determination that the initial timing slack available for stealing is insufficient, determining whether the initial timing slack available for stealing is on a feedback path; and, responsive to determining that the initial timing slack available for stealing is on the feedback path, replacing the initial timing slack available for stealing with a next worse slack.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

enhanced timing performance in an integrated circuit (IC) design;

reduced power consumption in an integrated circuit (IC) design;

ability to meet high-frequency design goals in an integrated circuit (IC) design;

applicability to current and future industry-wide complex high performance microprocessor designs, which tend to have many latch feedback paths due to certain common logic design traits.

These and other features and advantages of the present invention will become apparent from the following detailed description of illustrative embodiments thereof, which is to be read in connection with the accompanying drawings.

DETAILED DESCRIPTION

One or more embodiments provide techniques for feedback-aware slack stealing across transparent latches empowering performance optimization of digital integrated circuits. One or more embodiments advantageously improve the effectiveness of performance and/or power optimization. As will be appreciated by the skilled artisan, performance and/or power is/are function(s) of available positive slack. Aspects of the invention improve slack stealing/balancing opportunities across transparent latches by identifying and exploiting feedback traits in the topology of real hardware designs to further aid in timing performance enhancement and/or power reduction.

Figure 1:
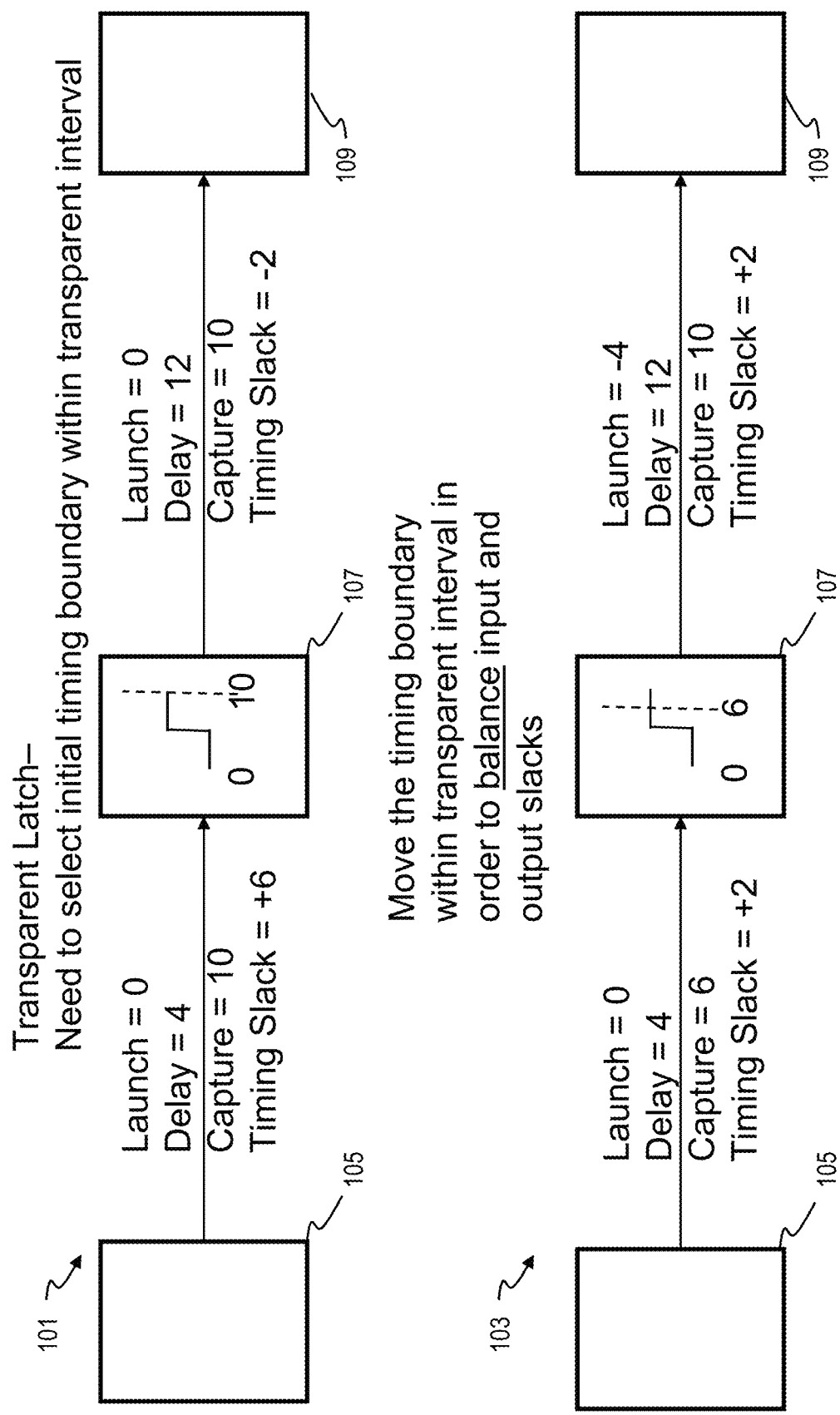
FIG. 1 illustrates slack stealing in a transparent latch, which can be enhanced in accordance with one or more embodiments.

As noted, "slack stealing," also referred to as "slack balancing," "slack borrowing," "slack adjustment," "cycle stealing," "cycle boundary adjustment," and the like, refers to a technique wherein paths are adjusted to "steal" excess slack from a path with positive slack and provide it to a path that has negative slack or an inadequate margin. Refer now to FIG. 1. As seen in view 101, there are three latches, 105, 107, and 109. Latches in general can be transparent or non-transparent. In the case of a transparent latch, the slack on the next stage can be influenced. If all the latches are non-transparent, the timing must be closed independently on the logic. However, in the example, latch 107 is a transparent latch (i.e. the inputs are passed straight through to the outputs when the "select" signal (essentially, the clock) is active, and when the select signal goes inactive, the final input state is latched on the outputs). It is desired to select the initial timing boundary within the transparent interval. As used herein, "transparent interval" is the length of the window for which the "select" signal is active; typically, the input clock to the latch. Because the middle latch 107 is transparent, it is possible to examine the second logic and see if the second logic has significant positive slack—if so, it can lend some slack into the first logic—this is slack stealing. The slacks can also be balanced towards the output when the first logic has sufficient positive slack, so that in this aspect, the first logic can lend slack to the second logic, which is driven by the first logic, by adjusting the cycle boundary in the other direction.

Between latch 105 and latch 107, the launch is zero, the delay is four, the capture is ten, and the timing slack is thus plus six (10–4). Between latch 107 and latch 109, the launch is zero, the delay is twelve, the capture is ten, and the timing slack is thus minus two (10–12). Referring now to view 103 in FIG. 1, move the timing boundary within the transparent interval in order to balance input and output slacks. In view 103, between latch 105 and latch 107, the launch is zero, the delay is four, the capture, as a result of moving the cycle boundary, is six, and the timing slack is thus plus two (6–4). Between latch 107 and latch 109, the launch is minus four (as moved), the delay is twelve, the capture is ten, and the timing slack is thus plus two (10–12–(–4)).

"Feedback-aware" refers to a topology where there is a set of logic gates which goes out of a latch and eventually comes back to it. One or more embodiments provide enhanced slack balancing in cases where feedback is present; heretofore, opportunities for slack stealing afforded by feedback have not been exploited. In FIG. 1 view 101, between the first two latches 105, 107 the timing slack is plus six, but between the second and third latches 107, 109 it is minus two. Because the middle latch is transparent, the cycle boundary can be moved from ten to six, as in the view 103, putting more constraints on the input logic, where they can be tolerated, and fewer constraints on the output logic. Each now has positive slack of 2 ps.

A prior art timing adjustment approach uses the worst latch output slack to compute timing adjustments, wherein power budget is the main criteria for adjustments. In prior art techniques, no topological traits are considered. In contrast, one or more embodiments employ consideration of topological traits to aid determination of which latch should be used for stealing. Furthermore, the prior art basic slack balancing algorithm is also topology-unaware, especially with regard to feedback paths, and thus is unable to fully exploit slack stealing and slack vacuuming. Here, slack vacuuming is referred to as effectively performing slack balancing across more than one latch stage, so the slack benefits actually propagate through multiple latches onto a needy one.

Figure 2:
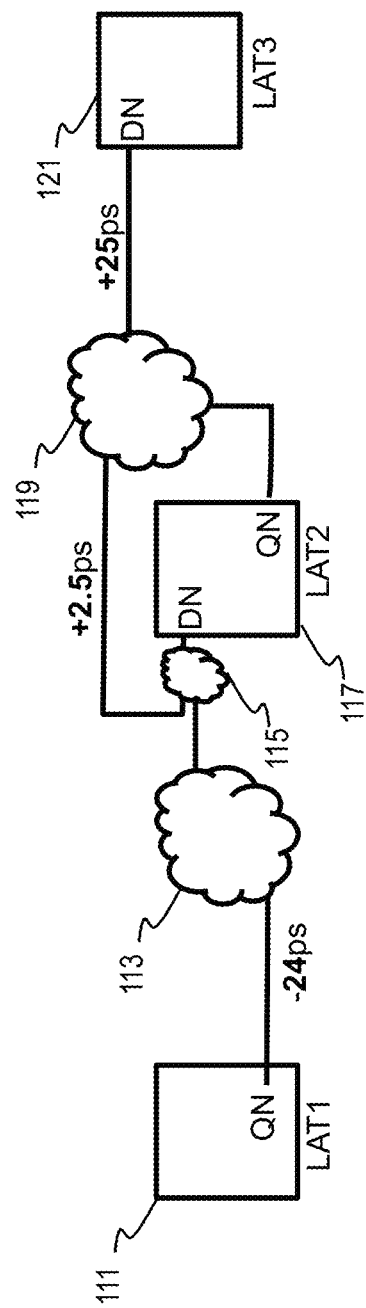
FIG. 2 is a block diagram illustrating aspects of latch feedback aware stealing enhancement, in accordance with one or more embodiments.

Referring now to FIG. 2, one or more embodiments provide latch feedback-aware slack stealing enhancement. Note Latch 1 numbered 111, Latch 2 numbered 117, and Latch 3 numbered 121. Cloud 113 represents the set of paths from output QN of latch 111 to input DN of latch 117. Cloud 119 represents the set of paths from output QN of latch 117 to input DN of latch 121. Cloud 115 represents set of feedback paths from output QN of latch 117 to input DN of latch 117. Note that paths from 113 can interact and go through 115 onto 117; similarly, paths out of 117 QN through 119 split to go onto 121 and some onto 117 DN through 115. The path under consideration from latch 111 to 117 has −24 picoseconds (ps) of slack; the worst path from latch 117 to latch 121 has +25 ps of slack, and the worst feedback path has +2.5 ps of slack. Using prior art techniques, the available slack to steal at the output QN of latch 117 is only +2.5 ps, which is not enough to fix the path from latch 111 to latch 117 (−24+2.5=−21.5). However, consider that because the +2.5 ps slack is on a feedback path (i.e. travelling downstream one ends up back at the input to the same latch), it can be seen that, because of the feedback, there is, in essence, both stealing and alleviating on the same path, such that there is really zero net effect on feedback. Thus, there is in fact the opportunity to steal more slack without impacting the feedback path. One or more embodiments thus look at the next most limiting path that does not exhibit feedback; i.e., the most limiting true downstream path. One or more embodiments, in the example of FIG. 2, thus look to the +25 ps available for stealing on the path between latches 117 and 121. This makes more physical sense than being limited by a feedback path; stealing the slack from the path between latches 117 and 121 does not impact the feedback path at all.

In the example of FIG. 2, one or more embodiments are able to increase a +2.5 ps improvement to a +25 ps improvement, enhancing the ability to meet timing goals and/or power goals based on budget. Indeed, in one or more embodiments, without loss of generality, where a latch is determined, based on prior art assumptions, to have insufficient slack available to steal, determine whether there is feedback on the latch, and if the critical slack (=worst (lowest slack)) is from the feedback path, the feedback path and its slack is simply omitted from the analysis and the next most critical path that is not a feedback path is selected for slack stealing. The slack values can then be updated in the algorithm to enhance slack stealing, subject to the constraint that no timing failures are introduced. Note that feedback is viewed from the point of view of the input or the output depending on the desired direction of the stealing. There can be more than one feedback path; all feedback paths can be skipped but it is not appropriate to go beyond the first non-feedback path. For example, if the first five paths were all feedback, and the sixth path non-feedback, stealing is appropriate from any one up to the sixth path but not the seventh or higher (where it will then start introducing violations in paths that were more critical than the higher selected path).

Thus, by way of review and provision of additional detail, in FIG. 2, the governing slack at the latch output for latch 117 is 2.5 ps (thanks to the feedback); this maximum 2.5 ps steal mainly circulates in the feedback and alleviates the "true" upstream latch 111 stage by just 2.5 ps. However, using aspects of the invention, identify that this critical latch output slack comes from the feedback path. For better optimization, an approach according to one or more embodiments looks beyond the feedback, picking the next worst "true" downstream slack of 25 ps to be used, and the full 25 ps credit can be given back to the latch 111 stage to help pass the timing requirements. This does not make the feedback path fail in any way because the input gets 25 ps credit and the output gets 25 ps debit, so that the net effect is nullified and the feedback slack does not worsen.

The improved 25 ps steal is leveraged to either power down the gates, or more importantly in one or more embodiments, to meet the high-performance timing criteria and meet the frequency goals. Accordingly, without loss of generality, for latches with initial output slack deemed insufficient and/or below certain credit requirement specifications (e.g. so as to at least pass the "true" upstream latch stage timing), one or more embodiments:

(i) first identify whether the slack is caused by a feedback path;

(ii) in case of feedback, automatically omit the feedback path and its slack, and trace the next worst slack value to gain more credit without causing any failures in doing so.

Still by way of review and provision of additional detail, in FIG. 2, note the multiple paths from the second latch 117. In the prior art, the most constraining (worst case) path governs. For example, in the prior art, if there were five branches, with slacks −1, −2, −3, −4, −5, then the slack at the latch output is the worst value, −5. One or more embodiments examine topology to determine if any of the branches is a feedback branch. Refer to feedback branch +2.5 ps. Clouds 113, 115, 119 represent combinational logic with no latches involved. The output of latch 111 has −24 ps slack; the feedback branch has +2.5 ps slack; and the non-feedback branch to latch 121 has +25 ps slack. With current techniques, at the output of latch 117, the worst slack of all branches will be seen; namely, +2.5 ps. One or more embodiments carry out path tracing to determine that the +2.5 ps branch is a feedback branch that has no effect; what should be considered, in a non-limiting but preferred embodiment, is the most limiting non feedback path. Stealing even ten picoseconds does not affect the feedback path because it amounts to 2.5+10−10; only the rest of the path is affected. One or more embodiments employ a "looking beyond" technique wherein the next non-feedback critical path (here, to latch 121) is examined for slack (+25 ps) that can be stolen. In the prior art, only look at the worst case; do not consider that the 2.5 ps is a feedback; in embodiments of the invention, because it is a feedback path, the feedback in essence "moves along with it" and the technique looks for the next worst case that is downstream and not feedback, and it is determined that there is more slack available to steal.

So, for latches with insufficient stealing available, see if there is feedback on the latch, deduce whether the worst slack is in a feedback path; if yes, eliminate the feedback path from the slack-stealing analysis, and look for the worst non-feedback branch. One or more embodiments do this without introducing any timing failures.

Figure 3:
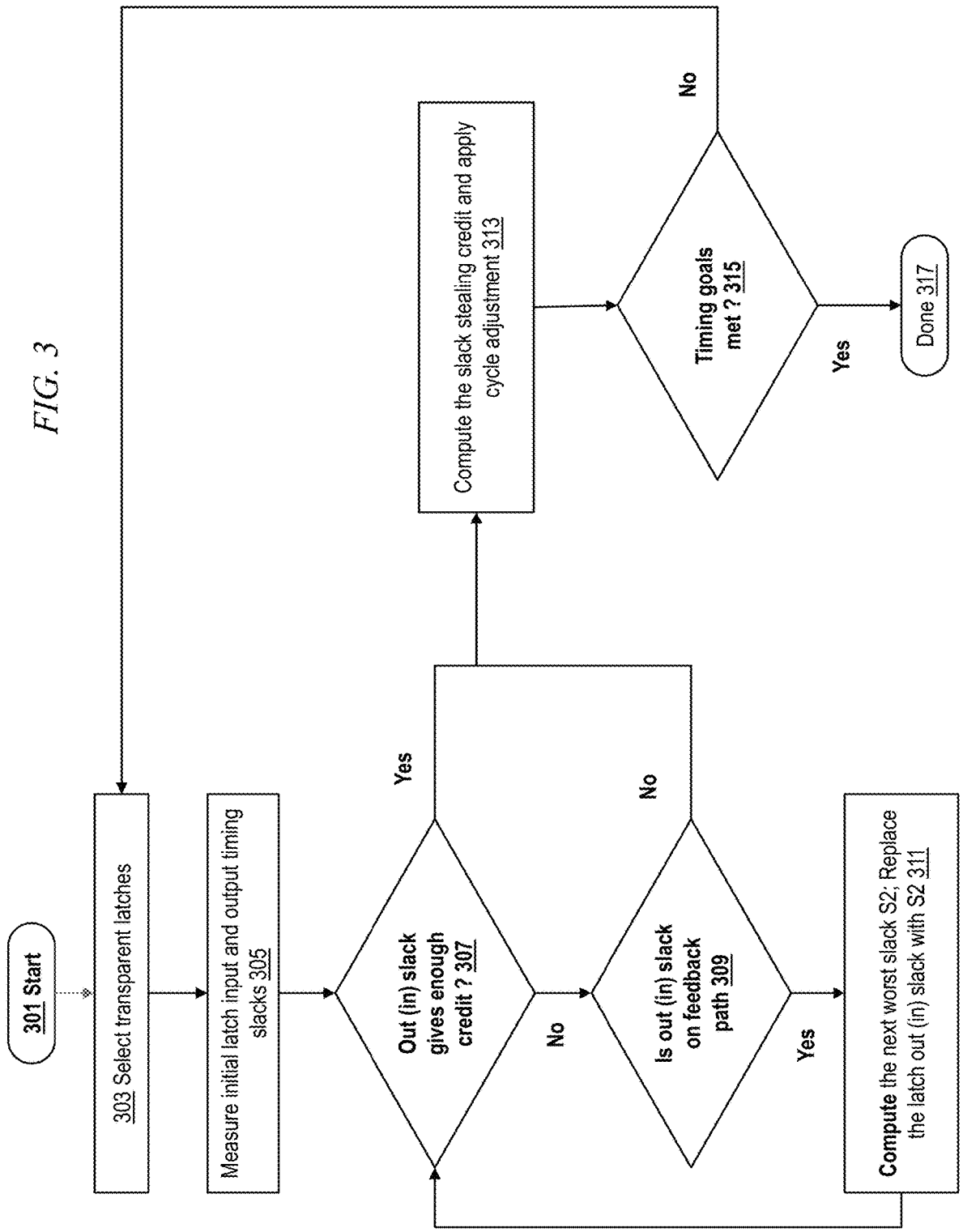
FIG. 3 is a flow chart illustrating aspects of latch feedback aware stealing enhancement, in accordance with one or more embodiments.

Refer now to the flow chart of FIG. 3, which begins at 301. In step 303, select one or more transparent latches in the putative circuit design for evaluation. In step 305, measure the initial latch input and output timing slacks. In decision block 307, determine whether the output or input slack, as the case may be, provides enough credit for slack stealing. If so (YES branch of decision block 307), proceed to step 313, compute the slack stealing credit and apply the cycle adjustment. Then proceed to decision block 315. If the timing goals are now met (YES branch of decision block 315), the process is finished at terminator block 317. On the other hand, if the timing goals are not met (NO branch of decision block 315), proceed back to step 303 and continue the logical flow.

In decision block 307, if the output or input slack, as the case may be, does not provide enough credit for slack balancing (NO branch of decision block 307), proceed to decision block 309 and determine if the output or input slack, as the case may be, that was used for the determination is on a feedback path. If not (NO branch of decision block 309), proceed to step 313 wherein logical flow proceeds as describe above. However, if the slack was on a feedback path (YES branch of decision block 309), proceed to step 311 and compute the next worst slack (S2), and replace the output or input slack, as the case may be, that was used for the calculations with S2 and proceed back to decision block 307.

There are a number of techniques that can be used to determine the worst path slack, next worst path slack, and so on. Some embodiments use a path-based approach. For example, Yen's algorithm for ksp (k shortest paths) can be employed, or techniques as published in Tsung-Wei Huang et al., UI-timer: an ultra-fast clock network pessimism removal algorithm, 2014 IEEE/ACM International Conference on Computer-Aided Design (ICCAD) 2014 Nov. 2 (pp. 758-765) (IEEE) can be used, given the teachings herein.

In one or more embodiments, paths are traced on as-needed basis. One or more embodiments trace the worst first, then the next subcritical (i.e. next worst) as needed, and repeating as needed. We have found this implementation to be more efficient than a brute-force path trace. Note that only slacks from feedback should be ignored, the worst slack from non-feedback logic should be honored.

Another example of a technique that can be used to determine the worst path slack, next worst path slack, and so on is a block-based approach. For the output or input pin under feedback scrutiny, as the case may be, disable propagation of the required arrival time (RAT) from the inputs (or, as the case may be, arrival time (AT) from the outputs). For example, assert a very large (in magnitude) non-critical RAT from the inputs (or, as the case may be, AT from the outputs) and update the timing incrementally (recompute timing slack only in the portion of the design that has changed; this is faster than re-computing the timing on the full chip). Re-query the output or input slack as the case may be. Criticality is guaranteed to be from non-feedback logic. Compute the adjustment. Note that Slack=RAT−AT. Stealing can again be carried out in both directions.

Enable back the propagation of the RAT from the inputs (or AT from the outputs as the case may be). For example, restore the original RAT values on the inputs or AT values on the outputs, update timing incrementally, apply the adjustment computed above prior to restoring, and continue.

Figure 4:
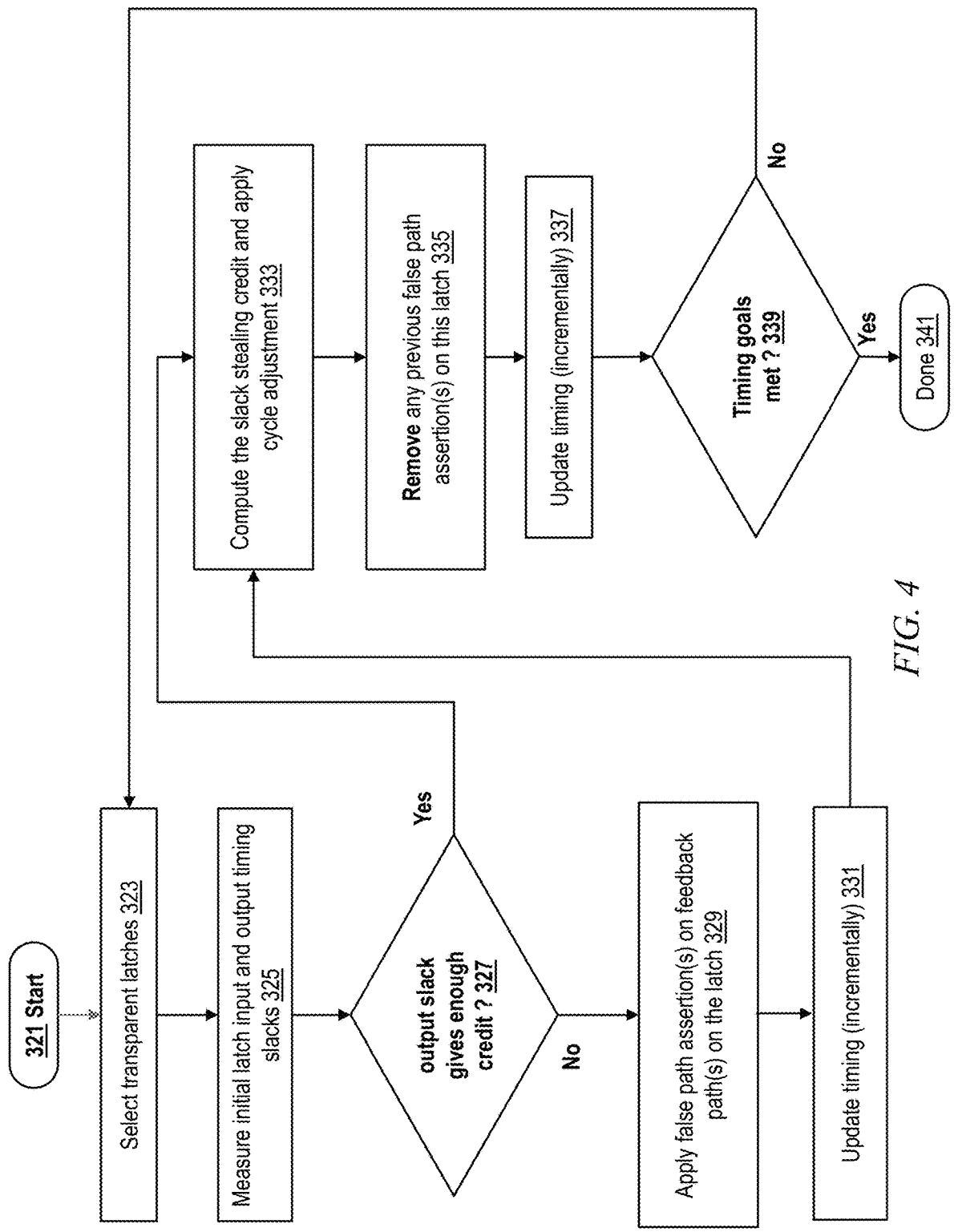
FIG. 4 is a flow chart illustrating aspects of latch feedback aware stealing enhancement, using false path assertion, in accordance with one or more embodiments.

Refer now to the flow chart of FIG. 4, depicting a false path assertion technique, which begins at 321. In step 323, select one or more transparent latches in the putative circuit design for evaluation. In step 325, measure the initial latch input and output timing slacks. In decision block 327, determine whether the output or input slack, as the case may be, provides enough credit for slack stealing. If so (YES branch of decision block 327), proceed to step 333, compute the slack stealing credit and apply the cycle adjustment. Then proceed to step 335 and remove any previous false path assertions (discussed below) on the latch in question, and in step 337, update the timing incrementally. Then, proceed to decision block 339. If the timing goals are now met (YES branch of decision block 339), the process is finished at terminator block 341. On the other hand, if the timing goals are not met (NO branch of decision block 339), proceed back to step 323 and continue the logical flow.

In decision block 327, if the output or input slack, as the case may be, does not provide enough credit for slack stealing (NO branch of decision block 327), proceed to step 329 and apply one or more false path assertions on the feedback paths on the latch in question. Then, update the timing incrementally in step 331 and proceed to step 333.

Various known path tracing techniques can be used with the false path assertion technique. These methods can be used to mark feedback paths as false paths. In this aspect, create separate phases along all the paths exclusively, update timing incrementally, and query the worst input/output slack among all phases but these. Feedback influence is thus automatically excluded. Compute the adjustment, and restore the original phases on those paths. Again, update the timing incrementally, apply the adjustment, and move on to the next step.

Transparent latches are a pertinent part of high performance designs (e.g., high performance microprocessor designs). It is desirable to allow cycle boundary adjustment to accommodate the unbalance in combinational logic stage delays. It is also important to model the transparency correctly, including obtaining accurate previous and next cycle slack measurements on each of the latch stages, modeling the cycle time boundaries, and adjusting as needed. Indeed, to evaluate the previous and next cycle slack on each of the latch stages, it is desirable to model the transparency correctly and model the cycle time boundaries and adjust in cases where balancing or stealing is needed. To be able to meet high frequency goals, accurate cycle adjustment is important.

Industry wide complex designs (e.g. high performance microprocessors) tend to have many latch feedback paths, due, for example, to certain common logic design traits. "Value holding" logic around latches is a common scenario, wherein a value is held until a certain input condition is met across clock cycles. Purely by way of example and not limitation, a certain design might have ten thousand transparent latches, fifteen hundred of which have as the critical path a direct feedback path. These may well be scattered across the topology, and impact the timing of a significant portion of the design. One or more embodiments advantageously address such scenarios.

In one or more embodiments, slack balance can be carried out in two directions: output feedback is traced to steal from output to input, and input feedback is traced to steal from input to output. Furthermore, one or more embodiments consecutively trace more than one sub-critical feedback path in increasing slack order, until a non-feedback path is reached, and until sufficient slack credit is obtained.

In some cases, the next worse slack is computed using a block-based method. Some embodiments apply false path assertions on feedback paths, followed by updating timing and re-querying the output slacks.

One or more embodiments include making at least one design change based on at least one adjusted cycle time boundary, after which at least one cycle adjustment is again computed. This can be performed incrementally, for example.

Aspects of the invention include a system and method of topology-aware slack stealing across transparent latches empowering performance optimization of digital integrated circuits, including selecting at least one transparent latch; determining initial timing slack for the transparent latch input and output; determining whether the output slack is from a feedback path to the latch; computing the next worst output slack by omitting effects of timing propagated on and from feedback; and using the newly computed output slack to derive new stealing credit.

Some instances further include consecutively tracing more than one sub-critical feedback path in increasing slack order until a non-feedback path is reached.

Some embodiments further include consecutively tracing more than one sub-critical feedback path in increasing slack order until the found slack criteria is met; i.e., the found slack is deemed enough for stealing. This can typically only go on until a non-feedback path is found, in which case, that is the highest it is feasible to go.

In some cases, computing the next worst output slack by omitting effects of timing propagated on and from feedback is carried out by applying false path assertions on such paths followed by updating timing and re-querying the output slacks.

One or more embodiments further include making at least one design change based on at least one adjusted cycle time boundary. Some such embodiments further include, after making at least one design change, computing at least one stealing credit on the transparent latch. In some instances, this is performed incrementally.

One or more embodiments are implemented within an EDA timing engine.

In one or more instances, remove the influence of feedback and determine the next "steal-able" slack. Three exemplary techniques to determine next the steal-able slack include: path based, block based, and false path assertion (FIG. 4). Current EDA timing tools can be adapted for false path assertion, given the teachings herein.

Advantageously, one or more embodiments further permit optimization.

One or more embodiments modify the timing calculations using efficient slack stealing; in at least some instances, without changing the design itself. One or more embodiments modify the timing solution by balancing slacks. One or more embodiments modify the slack stealing engine, enhancing its efficiency and/or providing more opportunities for slack stealing. For the avoidance of doubt, it should be noted that, when reference is made herein to "modifies the timing calculations using efficient slack stealing without changing the design itself," what is meant is that one or more embodiments adjust the cycle boundary in timing analysis appropriately without changing the design itself i.e. without making any physical changes in the clock tree, but rather in software. Cycle boundary adjustment can also be done on hardware by physically changing logic on the clock paths so the cycle boundary can be shrunk/expanded, which is not done in one or more embodiments (undesirable way of doing stealing, as can't do more and can't change it after clock tree synthesis is done). One or more embodiments do not need a design change to happen in order to perform stealing, while that is required in one or more prior art techniques. Hence, reference is made herein to "without changing the design itself." It should be noted, however, that one or more embodiments do make at least one design change based on at least one timing adjustment; this is to say, AFTER the at least one timing adjustment, a physical change to the logic on the data side can be made as part of the physical design optimization process to recover power or timing i.e. design fixups. Accordingly, one or more embodiments carry out some slack stealing, then perform some design optimization (e.g. upsizing the gates to make paths faster to fix the post-adjustment slack, or reducing the size of the gates to recover power on the path when, due to slack stealing, the path was rendered with more positive slack). This is to be distinguished from prior art techniques which must do design changes physically in the clock tree to achieve the slack stealing.

Given the discussion thus far, it will be appreciated that an exemplary method for increasing the efficiency of electronic design automation, according to an aspect of the invention, includes (e.g., steps 303, 323) identifying, in a putative electronic logic circuit design, at least one transparent latch 117 as a candidate for slack stealing; and (e.g., steps 305, 325) determining an initial timing slack, available for stealing, associated with the at least one transparent latch. A further step includes, responsive to a determination (e.g., NO branch of decision block 307, 327) that the initial timing slack available for stealing is insufficient, determining whether the initial timing slack available for stealing is on a feedback path (e.g., decision block 309 or via false path assertion 329, 331). A still further step includes, responsive to determining that the initial timing slack available for stealing is on the feedback path (e.g., YES branch of decision block 309), replacing the initial timing slack available for stealing with a next worse slack (e.g., step 311); this step can also be done via false path assertion as per steps 329, 331.

Regarding the penultimate step, it will be appreciated that in one or more embodiments, feedback is pertinent, because picking the slacks happens in worst-first order.

It should be noted that in addition to increasing the efficiency of EDA, one or more embodiments directly impact the quality of resulting hardware. EDA efficiency can be enhanced by making the design automation life easier for the same end product which is the hardware.

At least some embodiments further include making the determination that the initial timing slack available for stealing is insufficient (decision blocks 307, 327).

Some embodiments further include computing the next worse slack including omitting effects of timing associated with the feedback path (e.g., in step 311 or via false path assertion as discussed).

Some embodiments further include repeating the steps of making the determination that the initial timing slack available for stealing is insufficient, determining whether the initial timing slack available for stealing is on a feedback path, computing the next worse slack, and replacing the initial timing slack available for stealing with a next worse slack, with the next worse slack substituted for the initial timing slack in each repetition, until a repetition is reached wherein the next worse slack is not on a feedback path and/or the next worse slack is sufficient, and, when the repetition is reached wherein the next worse slack is not on the feedback path and/or the next worse slack is sufficient, computing a slack stealing credit and applying a cycle adjustment. Refer to FIG. 3, looping through decision blocks 307, 309 and step 311 until a repetition is reached wherein the next worse slack is not on a feedback path (NO branch of decision block 309) and/or the next worse slack is sufficient (YES branch of decision block 307); then proceeding to step 313. Refer also to FIG. 4, decision block 327 and application of false path assertion.

It is worth noting that as used herein, including the claims, "next worse slack" is essentially the closest better slack than the currently worst slack, but worst among the remaining slacks; i.e., the one that falls in next to the existing one when the top N worst slacks are arranged in increasing slack order i.e. −5, −4, −3, −2 and so on. Accordingly, the next worse slack to −5 is −4 and so on.

Furthermore, in one or more embodiments, "next worse slack" is not limited to just the one very next worst slack after the current worst slack which was deemed inefficient, but it also means the technique can go on and search for further worse slacks, with each one getting better than the previous, stopping at a certain point and picking that slack for stealing for the reason that the first non-feedback path has been reached and/or the technique is still on feedback paths but the new slack is deemed sufficient.

One or more embodiments further include determining whether an overall timing goal is met (decision blocks 315, 339), and, responsive to the determining indicating that the overall timing goal is met, completing the method (YES branch of blocks 315, 339 to terminators 317, 341); and/or responsive to the determining indicating that the overall timing goal is not met, repeating the method for at least one additional transparent latch (NO branch of blocks 315, 339).

Computing the next worse slack can be carried out via a path-based technique; a block-based technique; and/or a false path assertion technique.

The block-based technique can include, for example, at least one of a disabling technique and a tagging technique. In a disabling approach, disable propagation of one of a required arrival time and an arrival time; re-determine the initial timing slack; and restore the propagation of the one of the required arrival time (RAT) and the arrival time. Refer to the above discussion of disabling propagation of RAT from the inputs or AT from the outputs as the case may be. In a tagging approach, "tag" required arrival time with a test latch and then back-propagate tags. In general, one or more embodiments include propagating in a block based fashion from a test a first required arrival time to a latch output; determining if first required time is due to feedback loop; and, if so, propagating another block-based required arrival time to measure slack for a non-feedback loop. In one or more embodiments, the determining if the first required time is due to a feedback loop is based on a tag. In the tag approach, one or more embodiments propagate the RAT backwards using tags from the latch input to the output. Determine whether this tagged RAT, if any, reaching at the latch output, is the same as the original worst RAT at the latch output. If so, then it is a feedback path and the feedback is critical. With block-based tagging, the latch output will have two RATs now, one tagged and the other untagged. The worst untagged RAT can directly be used as a substitute for enhanced stealing, because influence of all the feedback path(s) is separated out into tagged RATs; untagged RATs now are guaranteed to be purely from non-feedback paths.

One or more embodiments thus leverage block-based timing to separate/identify things.

Referring specifically to FIG. 4, the false path assertion technique can include, for example, applying at least one false path assertion on the feedback path, as per step 329; incrementally updating timing based on the at least one false path assertion, as per step 331; and, subsequent to computing the slack stealing credit and applying the cycle adjustment, removing the at least one false path assertion and incrementally updating the timing based on the removing, as per steps 335, 337.

One or more embodiments are equally applicable to cases where the feedback path includes an output feedback path traced for slack stealing from output to input and cases wherein the feedback path includes an input feedback path traced for slack stealing from input to output As discussed, one or more instances further include making at least one design change to the putative electronic logic circuit design based on the cycle adjustment; at least some such instances further include computing at least one stealing credit on the at least one transparent latch after making the at least one design change, wherein the at least one stealing credit is computed incrementally.

One or more embodiments include updating the putative electronic logic circuit design to reflect the at least one design change; and fabricating a physical integrated circuit in accordance with the updated putative electronic logic circuit design. For example, referring to FIGS. 6-8 discussed elsewhere herein, render the updated putative electronic logic circuit design in a design language; and prepare a layout based on the updated putative electronic logic circuit design rendered in the design language. Instantiate the layout as a design structure. The physical integrated circuit is then fabricated in accordance with the design structure.

Accordingly, in one or more embodiments, the layout is instantiated as a design structure. See discussion of FIG. 6. A physical integrated circuit is then fabricated in accordance with the design structure. See again discussion of FIG. 6. Refer also to FIG. 7. Once the physical design data is obtained, based, in part, on the analytical processes described herein, an integrated circuit designed in accordance therewith can be fabricated according to known processes that are generally described with reference to FIG. 7. Generally, a wafer with multiple copies of the final design is fabricated and cut (i.e., diced) such that each die is one copy of the integrated circuit. At block 410, the processes include fabricating masks for lithography based on the finalized physical layout. At block 420, fabricating the wafer includes using the masks to perform photolithography and etching. Once the wafer is diced, testing and sorting each die is performed at 430 to filter out any faulty die.

Figure 5:
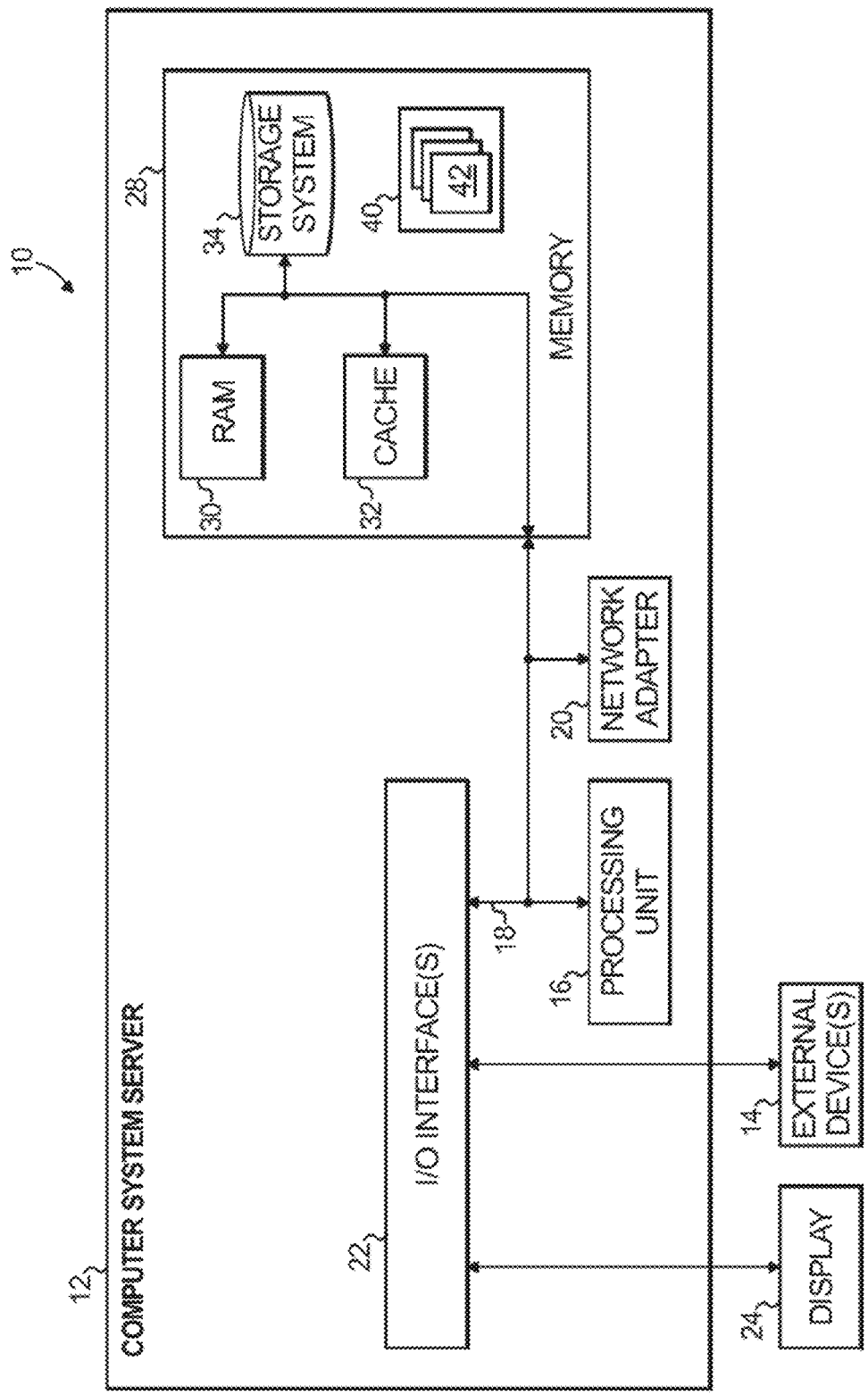
FIG. 5 depicts a computer system that may be useful in implementing one or more aspects and/or elements of the invention.

One or more embodiments include a computer including a memory 28; and at least one processor 16, coupled to the memory, and operative to carry out or otherwise facilitate any one, some, or all of the method steps described herein (as depicted in FIG. 5). In one or more embodiments, the performance (speed) of this computer is improved, for example, by more rapid timing closure (step 1209 discussed elsewhere herein) due to enhanced slack stealing. Rapid timing closure can enable the designers to take the design through multiple design cycles in the same amount of time, potentially leading to a physically different and better design that has a different performance/power footprint when fabricated, as opposed to otherwise (i.e. in the case of hardware not designed using aspects of the invention). Accordingly, the amount of computer resources/CPU time needed during the design cycle, as well as the amount of human design engineer hours, can be reduced using aspects of the invention. Alternatively, with the same resources and design engineer hours, a different and better (in terms of power/performance and the like) chip can be designed.

Figure 6:
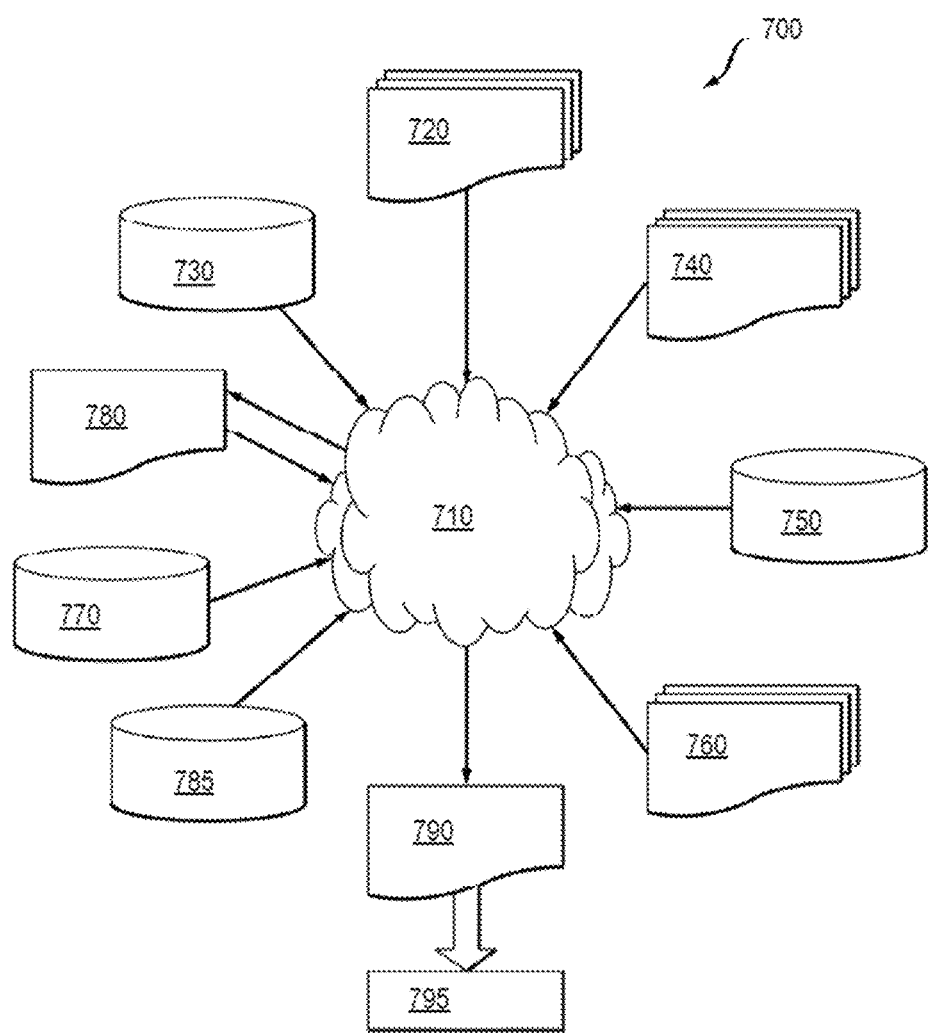
FIG. 6 is a flow diagram of a design process used in semiconductor design, manufacture, and/or test.
Figure 7:
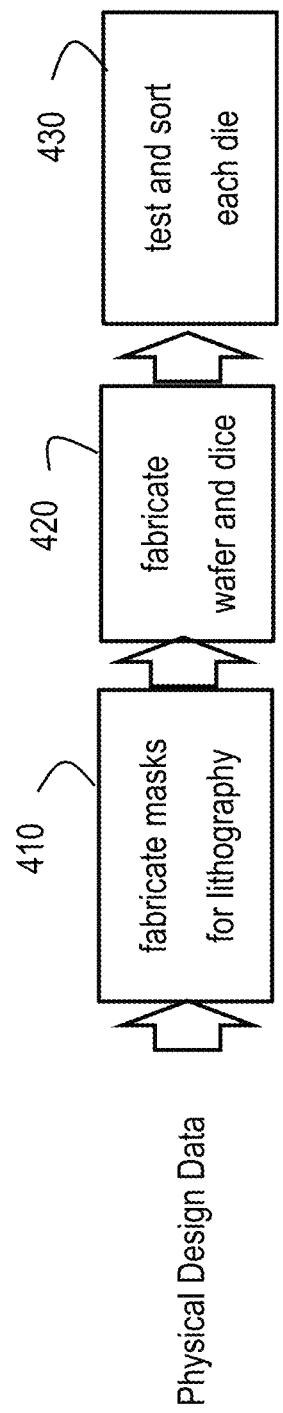
FIG. 7 shows further aspects of IC fabrication from physical design data.

Furthermore, referring to FIG. 6, in one or more embodiments the at least one processor is operative to generate a design structure for the circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because enhanced timing performance; reduced power consumption; and/or ability to meet high-frequency design goals in an integrated circuit (IC) design) as compared to designs not using aspects of the invention for EDA.

Figure 8:
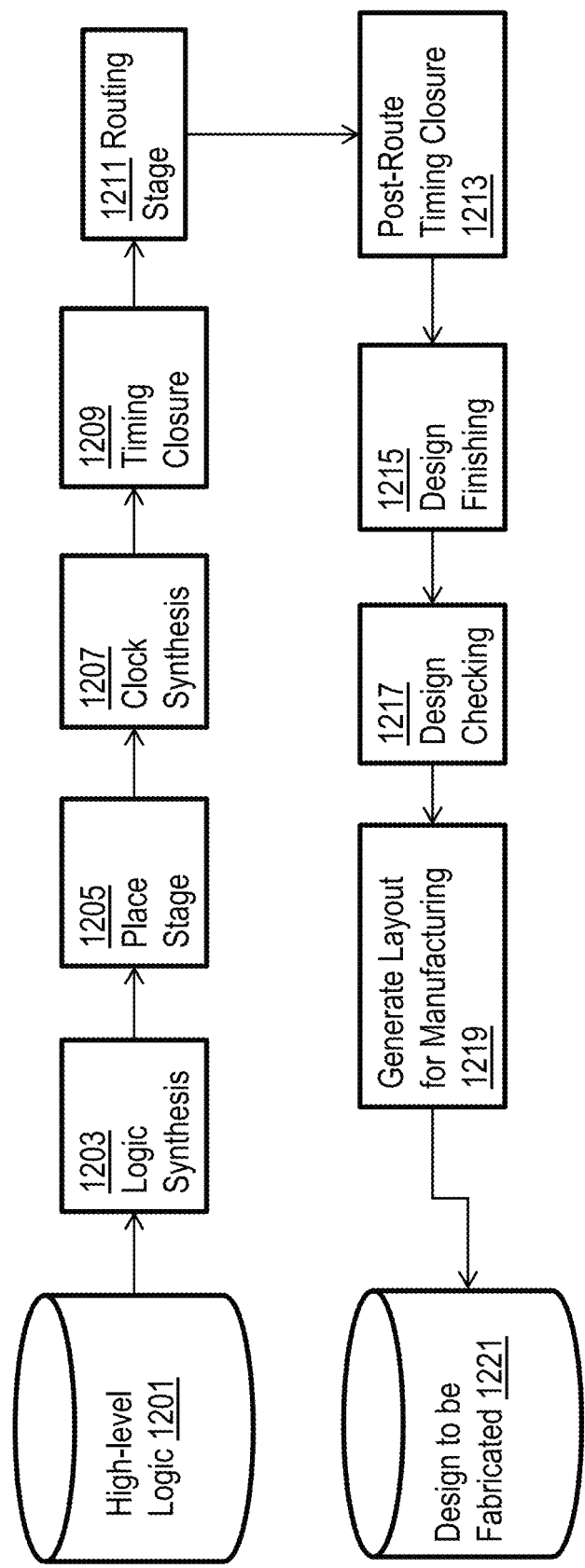
FIG. 8 shows an exemplary high-level Electronic Design Automation (EDA) tool flow, within which aspects of the invention can be employed.

FIG. 8 depicts an example high-level Electronic Design Automation (EDA) tool flow, which is responsible for creating an optimized microprocessor (or other IC) design to be manufactured. A designer could start with a high-level logic description 1201 of the circuit (e.g. VHDL or Verilog). The logic synthesis tool 1203 compiles the logic, and optimizes it without any sense of its physical representation, and with estimated timing information. The placement tool 1205 takes the logical description and places each component, looking to minimize congestion in each area of the design. The clock synthesis tool 1207 optimizes the clock tree network by cloning/balancing/buffering the latches or registers. The timing closure step 1209 performs a number of optimizations on the design, including buffering, wire tuning, and circuit repowering; its goal is to produce a design which is routable, without timing violations, and without excess power consumption. The routing stage 1211 takes the placed/optimized design, and determines how to create wires to connect all of the components, without causing manufacturing violations. Post-route timing closure 1213 performs another set of optimizations to resolve any violations that are remaining after the routing. Design finishing 1215 then adds extra metal shapes to the netlist, to conform with manufacturing requirements. The checking steps 1217 analyze whether the design is violating any requirements such as manufacturing, timing, power, electromigration (e.g., using techniques disclosed herein) or noise. When the design is clean, the final step 1219 is to generate a layout for the design, representing all the shapes to be fabricated in the design to be fabricated 1221.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 6 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved latch tree synthesis can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing the efficiency of electronic design automation, the method comprising:
    identifying, in a putative electronic logic circuit design, at least one transparent latch as a candidate for slack stealing;
    determining an initial timing slack, available for stealing, associated with said at least one transparent latch;
    responsive to a determination that said initial timing slack available for stealing is insufficient, determining whether said initial timing slack available for stealing is on a feedback path; and
    responsive to determining that said initial timing slack available for stealing is on said feedback path, replacing said initial timing slack available for stealing with a next worse slack.

2. The method of claim 1, further comprising making said determination that said initial timing slack available for stealing is insufficient.

3. The method of claim 2, further comprising computing said next worse slack including omitting effects of timing associated with said feedback path.

4. The method of claim 3, further comprising repeating said steps of making said determination that said initial timing slack available for stealing is insufficient, determining whether said initial timing slack available for stealing is on a feedback path, computing said next worse slack, and replacing said initial timing slack available for stealing with a next worse slack, with said next worse slack substituted for said initial timing slack in each repetition, until a repetition is reached wherein said next worse slack is not on a feedback path and/or said next worse slack is sufficient, and, when said repetition is reached wherein said next worse slack is not on said feedback path and/or said next worse slack is sufficient, computing a slack stealing credit and applying a cycle adjustment.

5. The method of claim 4, further comprising determining whether an overall timing goal is met, and, responsive to said determining indicating that said overall timing goal is met, completing said method.

6. The method of claim 4, further comprising determining whether an overall timing goal is met, and, responsive to said determining indicating that said overall timing goal is not met, repeating said method for at least one additional transparent latch.

7. The method of claim 4, wherein computing said next worse slack comprises a path-based technique.

8. The method of claim 4, wherein computing said next worse slack comprises a block-based technique.

9. The method of claim 8, wherein said block-based technique comprises at least one of a disabling technique and a tagging technique.

10. The method of claim 4, wherein computing said next worse slack comprises a false path assertion technique.

11. The method of claim 10, wherein said false path assertion technique comprises:

applying at least one false path assertion on said feedback path;
incrementally updating timing based on said at least one false path assertion;
subsequent to computing said slack stealing credit and applying said cycle adjustment, removing said at least one false path assertion and incrementally updating said timing based on said removing.

12. The method of claim 4, wherein said feedback path comprises an output feedback path traced for slack stealing from output to input.

13. The method of claim 4, wherein said feedback path comprises an input feedback path traced for slack stealing from input to output.

14. The method of claim 4, further comprising making at least one design change to said putative electronic logic circuit design based on said cycle adjustment.

15. The method of claim 14, further comprising computing at least one stealing credit on said at least one transparent latch after making said at least one design change, wherein said at least one stealing credit is computed incrementally.

16. The method of claim 15, further comprising:
updating said putative electronic logic circuit design to reflect said at least one design change;
fabricating a physical integrated circuit in accordance with said updated putative electronic logic circuit design.

17. The method of claim 16, further comprising:
rendering said updated putative electronic logic circuit design in a design language; and
preparing a layout based on said updated putative electronic logic circuit design rendered in said design language; and
instantiating said layout as a design structure;
wherein said physical integrated circuit is fabricated in accordance with said design structure.

18. A computer comprising:
a memory; and
at least one processor, coupled to said memory, and operative to increase the efficiency of electronic design automation by:
identifying, in a putative electronic logic circuit design, at least one transparent latch as a candidate for slack stealing;
determining an initial timing slack, available for stealing, associated with said at least one transparent latch;
responsive to a determination that said initial timing slack available for stealing is insufficient, determining whether said initial timing slack available for stealing is on a feedback path; and
responsive to determining that said initial timing slack available for stealing is on said feedback path, replacing said initial timing slack available for stealing with a next worse slack.

19. The computer of claim 18, wherein said at least one processor is further operative to increase the efficiency of the electronic design automation by:
making said determination that said initial timing slack available for stealing is insufficient;
computing said next worse slack including omitting effects of timing associated with said feedback path;
repeating said steps of making said determination that said initial timing slack available for stealing is insufficient, determining whether said initial timing slack available for stealing is on a feedback path, computing said next worse slack, and replacing said initial timing slack available for stealing with a next worse slack, with said next worse slack substituted for said initial timing slack in each repetition, until a repetition is reached wherein said next worse slack is not on a feedback path and/or said next worse slack is sufficient, and, when said repetition is reached wherein said next worse slack is not on said feedback path and/or said next worse slack is sufficient, computing a slack stealing credit and applying a cycle adjustment;
making at least one design change to said putative electronic logic circuit design based on said cycle adjustment;
updating said putative electronic logic circuit design to reflect said at least one design change;
render said updated putative electronic logic circuit design in a design language;
prepare a layout based on said updated putative electronic logic circuit design rendered in said design language;
instantiate said layout as a design structure; and
provide said design structure to fabrication equipment to facilitate fabrication of a physical integrated circuit in accordance with said design structure.

20. A non-transitory computer readable medium comprising computer executable instructions which when executed by a computer performing electronic design automation cause the computer to perform a method which increases the efficiency of the electronic design automation, the method comprising:
identifying, in a putative electronic logic circuit design, at least one transparent latch as a candidate for slack stealing;
determining an initial timing slack, available for stealing, associated with said at least one transparent latch;
responsive to a determination that said initial timing slack available for stealing is insufficient, determining whether said initial timing slack available for stealing is on a feedback path; and
responsive to determining that said initial timing slack available for stealing is on said feedback path, replacing said initial timing slack available for stealing with a next worse slack.

* * * * *